Figure 1A:
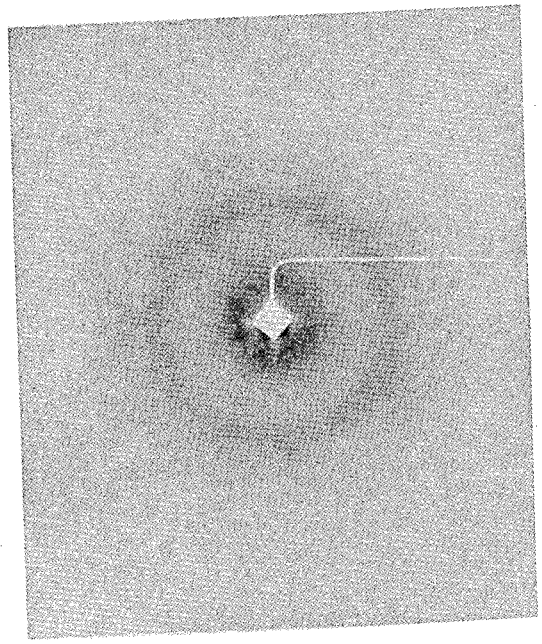
Figure 1B:
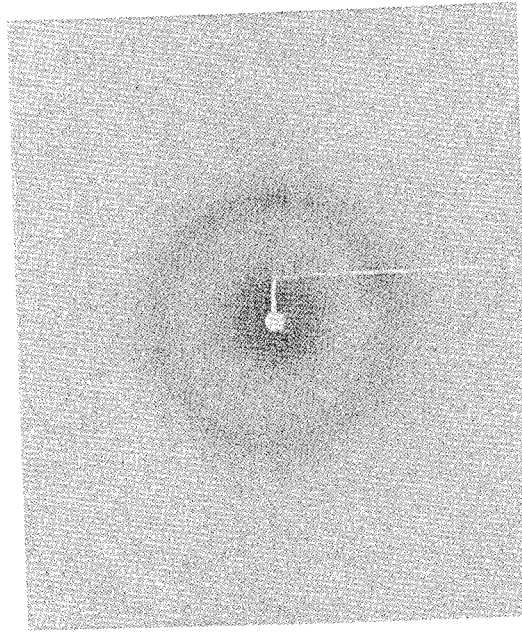

Inventor
Thomas G. Fox, Jr.
William E. Goode
James D. Stroupe

Inventor
Thomas G. Fox, Jr.
William E. Goode
James D. Stroupe 3,103,503
CRYSTALLINE POLY(METHYL METHACRYLATE)
Thomas G. Fox, Jr., Moorestown, and William E. Goode, Beverly, N.J., and James D. Stroupe, Newtown, Pa., assignors to Rohm & Haas Company, Philadelphia, Pa., a corporation of Delaware
Filed Apr. 11, 1957, Ser. No. 652,267
13 Claims. (Cl. 260—89.5)

This invention concerns crystalline poly(methyl methacrylate) and methods for preparing polymers of methyl methacrylate in the crystalline state.

Poly(methyl methacrylate) as heretofore known is an amorphous solid, which softens somewhat above 100° C. In the conventional polymers of methyl methacrylate, the molecules or chains are not located in space in any definite relationship to each other, the arrangement being not unlike that in a liquid except for the slightly increased degree of regularity caused by a chain-like structure. When the polymers of methyl methacrylate as heretofore known are examined by X-ray diffraction, the only scattering observed is similar to that of the liquid monomer.

Poly(methyl methacrylate) as known up until now is amorphous whether produced with the common free radical initiators or formed under the influence of an anionic initiator. The X-ray diffraction pattern of polymers prepared with the aid of alkali metal salts of a weak acid (in the Lewis sense) is similar to that of amorphous polymers formed, for example, with peroxides or azo catalysts. (Cf. Beaman, Jour. Amer. Chem. Soc. vol. 70), page 3115 (1948).

Treatment of the conventional, free-radically formed polymers of methyl methacrylate with a great variety of solvents under a wide range of conditions has failed to give other than polymers showing amorphous patterns by X-ray diffraction. This is also true for polymers formed at the boiling point of liquid ammonia under the influence of anionic initiators. We have found that crystalline forms of poly(methyl methacrylate) can be developed by polymerization under particular and rather special conditions to be defined below followed by treatment with a selected solvent under conditions which are also defined below. We, thus, provide novel plastic materials of unique properties and utilities.

Our method of forming crystalline poly(methyl methacrylate) comprises (a) forming a polymer of methyl methacrylate under conditions which we now find lead to an orderly and regular steric arrangement within the polymer chains, (b) treating the thus formed polymer with a border-line organic solvent therefor, herein termed a crystallizing solvent, which solvent has a compatibility with the poly(methyl methacrylate) designated by a solubility parameter, δ, within the range of 8 to 10, and which solvent also has a molar volume which is suitable for the particular polymer being treated, (c) ordering chain segments of the polymer at a crystallizing temperature in the presence of said solvent until a degree of three dimensional order of chain segments with respect to each other is attained which shows crystallinity by X-ray diffraction patterns, and (d) substantially removing the bulk of the solvent at a temperature below the melting point of the polymer-solvent system.

Figure 2:
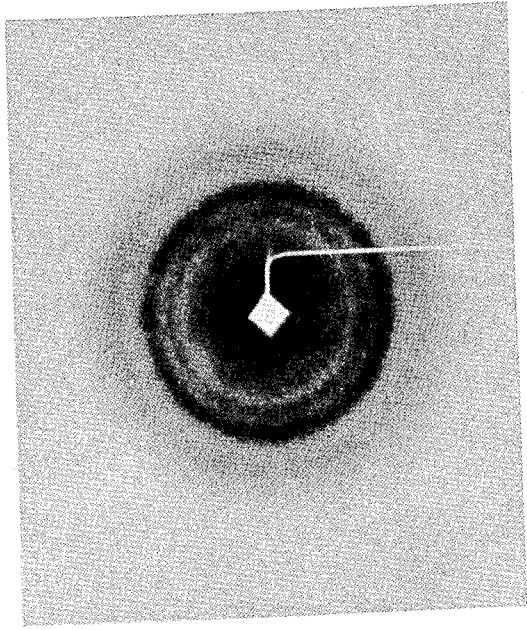
Figure 4:
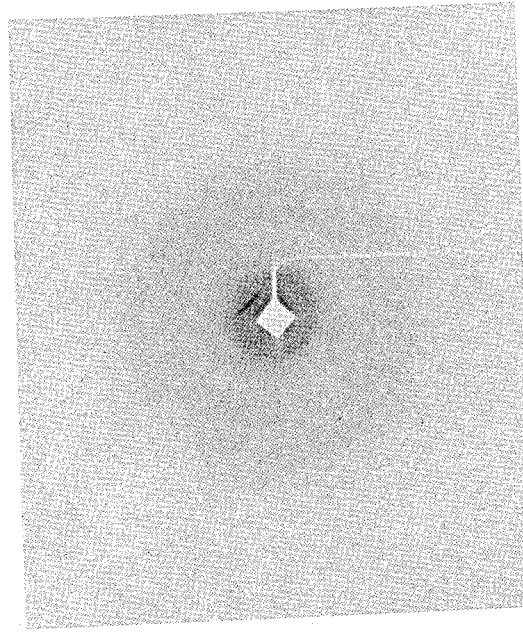
Figure 5A:
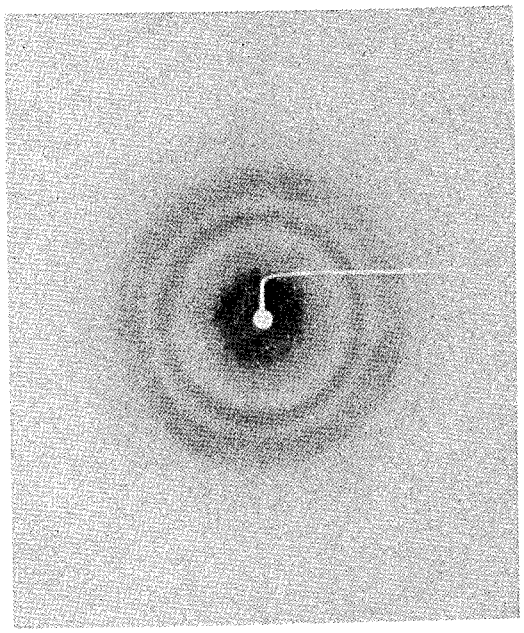
Figure 5B:
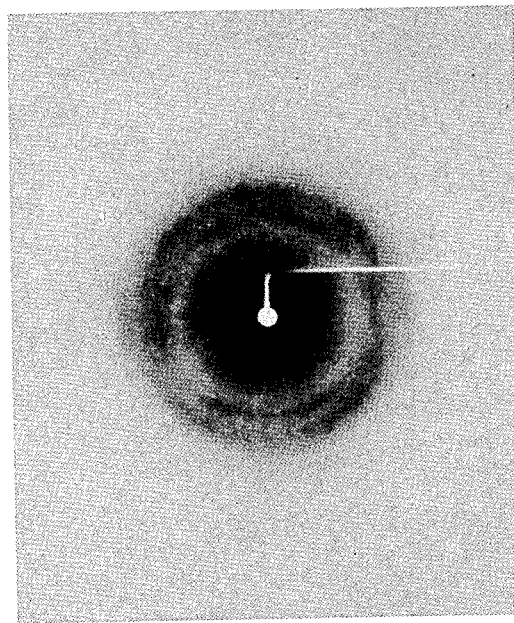

Typical X-ray diffraction patterns are shown in the accompanying drawings designated as FIGURES 1(a) through 5(b), which are positive copies of actual X-ray diagrams. In FIGURES 1(a) and 1(b), there are presented typical amorphous halos shown by crystallization but non-crystalline poly(methyl methacrylate) which can be developed by solvent treatment into Types A or C and Types B or D respectively. In FIGURE 2, there is shown a typical X-ray diffraction pattern exhibited by crystalline poly(methyl methacrylate) herein designated Type A. In FIGURES 3(a) and 3(b), there are shown typical X-ray diffraction patterns which are exhibited by Type B poly(methyl methacrylate), FIGURE 3(a) showing the halos for crystalline but unoriented polymer and FIGURE 3(b) showing the fiber diagram for crystalline, oriented polymer of Type B. FIGURE 4 presents a typical X-ray diffraction pattern for poly(methyl methacrylate) of Type C. In FIGURE 5(a), there is shown a typical X-ray diffraction diagram exhibited by crystalline poly(methyl methacrylate) of Type D. In FIGURE 5(b), there is shown an X-ray pattern which is obtained from crystalline poly(methyl methacrylate) of Type D which has been subjected to orientation.

Figure 3A:
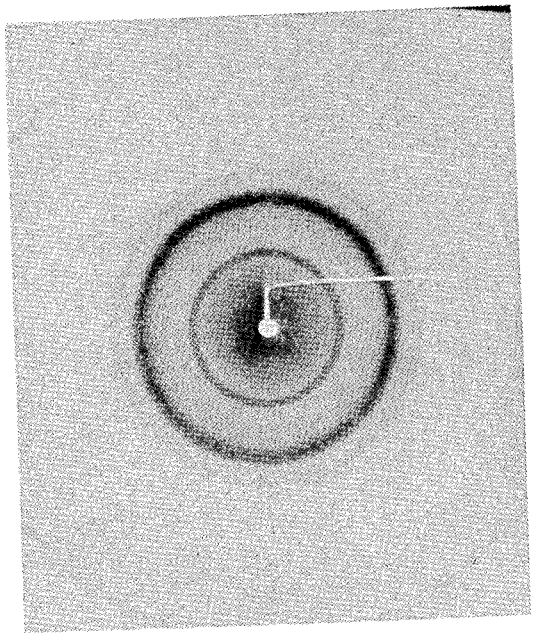

In the X-ray diffraction pattern given by Type A polymers and illustrated by FIGURE 2, there is a very strong line at 6.6 A. and a medium line at 8.0 A. At 5.2 A. and 4.5 A., there are two weak lines, while at about 10.2 A. there is an incompletely resolved line. Type A patterns tend to be somewhat diffused. In FIGURE 3(a), there is shown the X-ray diffraction pattern given by Type B polymers. In this pattern lines tend to be sharp. There are two very strong lines at 6.0 A. and 6.5 A., which are not usually resolved except in fiber diagrams. There is a strong line at 10.0 A. There is a weak line at 5.2 A., which is sharp. Other lines at shorter spacings have been observed.

Figure 3B:
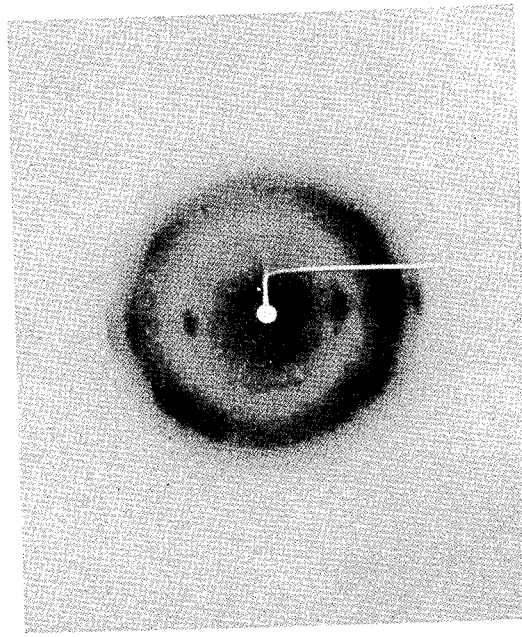

In FIGURE 3(b), there is shown an X-ray diffraction pattern which is characteristic of polymers of Type B in which the crystallites have been oriented to give concentrated arcs of X-ray scattering typical of oriented high polymer fibers.

In FIGURE 4 there is shown a typical diffraction pattern for Type C polymers. There is a very strong line at 20.5 A. There are two strong lines at 7.9 A. and 5.7 A. with a weak line at 4.6 A.

FIGURE 5(a) presents a typical X-ray diffraction pattern for the polymers of Type D. There is a very strong line at 6.4 A., a strong line at about 20.5 A., a weak to medium line at 8.0 A., and a weak line at 5.5 A.

In FIGURE 5(b) there appears an X-ray diffraction pattern which is typical of polymers of Type D which have been subjected to orientation. In this diagram there appear arcs which are super-imposed upon the rings of the usual pattern given by polymers of Type D.

The sodium chloride line at 2.81 A. has been imposed on the various figures for purposes of calibration. This line apears as the outermost one toward the corners of the prints and is common to all of these.

X-ray data were obtained photographically by exposure of polymer specimens 0.5–1.0 mm. thick to copper radiation for 6±1 hours at a specimen to film separation of 10.0±0.1 cm. Two layers of nickel foil placed over the film passed only CuKα diffraction maxima and minimized air scatter. All specimens were mounted directly over the rear pinholes of 0.030″ collimators. Fiber directions were vertical and perpendicular to the X-ray beam.

Each exposure was calibrated with the 2.81 A. NaCl line by replacing the polymer specimen with one of powdered sodium chloride for a one hour exposure. Accuracy of interplanar spacing measurements on these diffraction patterns inherently decreases with decreasing angle of diffraction and is not favored by the diffuse nature of many of the lines. The measurements and calculations of several operators were averaged to obtain the numbers stated. Their validity ranges from ±0.5 A. for the shortest spacings to ±1 A. for the longest. Intensity descriptions are relative for the diffraction characteristics of each crystalline poly(methyl methacrylate) structure.

Several interplanar spacings appear to be common to two or more diffraction patterns. For example, both FIGURES 4 and 5(a) show very strong diffraction in the 20-21 A. region. The incompletely developed plane at 10.2 A. in FIGURE 2 may correspond to the definite line at 10.0 A. in FIGURE 3(a). Figures 4 and 5(a) have strong diffraction lines at 8.0 A. All patterns show medium to very strong crystalline diffraction maxima in the 5-6 A. region of diffuse scattering by amorphous poly (methyl methacrylate). FIGURES 3(b) and 5(b) are typical of oriented, crystalline high polymers. They show the arced diffraction maxima of crystallites of preferred orientation superposed upon the continuous diffraction rings of randomly oriented crystallites and amorphous scattering background.

The above figures are representative of the X-ray diffraction patterns which are obtained from the various types of crystalline poly(methyl methacrylate). From all types, A, B, C, and D, lines weaker than medium may not appear in an individual X-ray diffraction pattern and, on the other hand, for an individual type there may appear additional lines in the diffraction pattern therefor. The patterns of the types shown in FIGURES 2-5(b) may nevertheless be used to identify our crystalline polymers if in each case there appear at least the lines having the relative intensity designated as medium, that is, as medium, strong, or very strong in relative intensity.

We have found that for developing crystallinity in poly(methyl methacrylate) it is necessary that polymer be formed under specific conditions which lead to development of a sterically ordered arrangement of mers within polymer chains. It must be pointed out that not all methods lead to such arrangement. The usual polymers formed by heating with a peroxide, for instance, exhibit no crystalline structure under all conditions now known. Only under specific conditions of polymerization are polymers formed which, when they have been treated with crystallizing solvent, exhibit a crystalline structure.

The conditions and systems which provide poly(methyl methacrylate) which can be developed into a crystalline form may conveniently be classified as follows:

(1) Free radical polymerization between about 0° and −75° C., (2) Polymerization below 0° C. in liquid phase in the presence of aluminum triethyl, (3) Anionic polymerization (a) In a polar, highly solvating medium at low temperatures with catalyst or initiator based on an alkali metal, alkaline earth metal, or quaternary ammonium salt, (b) In a non-polar, non-solvating medium over a range of temperature with a catalyst, such as a lithium catalyst, an alkaline earth catalyst, or a magnesium catalyst, which can form a coordinated complex with the ester, methyl methacrylate, (c) In a medium which has some solvating power either because of the nature of the solvent forming the medium or the presence in a non-polar, non-solvating medium of a small amount of a solvating organic solvent, (1) At low temperatures with a coordinating catalyst, (2) At moderate temperatures with a coordinating catalyst, and (3) At moderate temperatures with a non-coordinating catalyst.

The reason for the above classification of polymerization methods will become clearer when these various methods are considered in more detail hereinafter. It is sufficient to point out here that it is necessary to consider the special polymerization conditions which are favorable to later development of orderly steric arrangements, because not all methods of polymerization lead to this end result. The polymerization conditions which must be here used are specific. Different conditions can lead to different crystal structures, the various structures identified above resulting from the choice of catalyst or initiator, the environment in which it acts, and the specific conditions employed for the crystallization step.

Polymers, as obtained by the above polymerization procedures, are amorphous in their properties. When they are carefully examined through infrared absorption minor differences in absorption spectra are found which depend on their method of preparation. These differences appear both as shifts in frequency and as changes in absorption. They probably reflect variations in regularity of structure. The differences are small but nevertheless are not due to impurities. Polymers having absorption within these variations and giving no evidence of foreign absorption are regarded as pure methyl methacrylate polymers.

There are differences between the infrared absorption spectra of polymers as obtained in a non-crystalline state and of the polymers after they have crystallized. The differences between spectra for the non-crystalline state and spectra for the crystalline state vary with the respective types of crystalline polymer.

A polymer formed by one of the above procedures is treated with a defined solvent, i.e., is mixed, stirred, slurried, or shaken with a selected solvent at the temperature at which crystallization is to be effected or the polymer is heated with the solvent above this temperature including a temperature such that a homogeneous solution may be obtained and then this solution is cooled to a crystallizing temperature, where it is held while crystalline polymer forms. The crystallized polymer is now separated from the bulk of the solvent or the solution of polymer in solvent.

In some cases treating the polymer-solvent mixture mechanically may aid or speed up the crystallizing process. When crystallization has been effected, the bulk of the solvent is removed, as by evaporation below the melting point, or by mechanical separation in some cases. While there are some combinations of polymer and solvent which are not readily separable, it is preferred to use solvents which are substantially separable. For this end we prefer to use solvents boiling at normal pressures below 250° C., as these can be removed at least in large part below the melting point of the polymer, as by use of reduced pressure.

Not all liquids or solvents for poly(methyl methacrylate) promote crystallization. It has been found that liquids which will promote crystallization must possess a combination of properties, which can in general be defined and measured. On the basis of these properties it becomes possible to select solvents which can usually be expected to promote crystallization, consideration being given the type of crystalline polymer to be formed and the conditions of crystallizing.

First of all, the liquid must have a proper degree of compatibility with the polymer to be crystallized at the operating or crystallizing temperature to provide good mobility for the polymer molecules. Yet, in the thermodynamic sense the solvent power must not be so great as to dissolve the crystalline polymer freely. Then, the solvent must possess at least a minimum molar volume, the minimum varying somewhat with the compatibility and with the particular form and molecular weight of polymer to be crystallized. There is also a maximum molar volume for suitable crystallizing solvents, although this is not so sharp a limit as for the minimum volumes. This maximum is of the order of 450 for the effective molar volume.

Solvents defined by these criteria with numerical limits stated here are generally effective for developing a crystalline form and are here termed crystallizing solvents. There is a preferred range for each of the above tests for selecting suitable solvents. Beyond this preferred range there are effective solvents also, but there may be variation in their effectiveness. One of the reasons for this appears due to the capacity of some of these solvents to lower the melting point of the polymer-solvent system rather markedly as compared to lowering the apparent second order transition temperature or glass temperature of the system. What is here desired is as large a difference between these two points as is practical. Apparent ineffectiveness of some solvents with parameters close to the limiting value may be connected with failure to provide a sufficient difference between these two temperatures, and in such limiting cases this factor may come into play.

Since this difference is related to the glass temperature of the solvent, this temperature might also be considered in choosing a solvent, particularly in border-line situations. The solvent should have a glass temperature of not over −50° C. and preferably of not over −100° C.

It is necessary that the solvent must not depress the melting point of the polymer below the operating temperature.

There are some minor considerations with respect to the solvent. It should have sufficient internal fluidity to permit relatively rapid crystallization of polymer. At operating temperatures, the viscosity of the solvent should be less than about 1000 poises and, as our experience has shown, preferably less than 10 poises. The activation energy for flow for the solvent at operating temperatures should be not over about 20 kcals. and preferably less than 10 kcals. It is also desirable that the activation energy for flow for the polymer-solvent system at operating temperatures be less than about 40 kcals. and preferably less than 20 kcals. In general these requirements are well within the properties of solvents meeting the previous criteria so that they are not critical requirements except in limiting cases.

Compatibility can be appraised on the basis of a solubility parameter for each liquid which is represented by the symbol $\delta$. Methods for obtaining this parameter are well known in the art and values for it are tabulated for numerous liquids. When values of $\delta$ are between about 8.0 and 10.0, we have found, the liquids having these values have the degree of compatibility necessary to entitle them to consideration. It is preferred, however, that liquids be used having $\delta$ values between 8.2 and 9.9.

The solubility parameter is discussed, for example, in "Solubility of Nonelectrolytes," 3rd Ed., Hildebrand and Scott, Reinhold, New York, 1950 (see page 426) and in "Polymer Solutions," by Tompa, Academic Press, New York, 1956 (see pages 3.5 and 3.6). Specific values are given in such articles as Walker, J. Applied Chem., 2, 476-7 (1952), Moore and Brown, J. Applied Chem. 7, 332 (1957), and Moore et al., J. Polymer Sci., 23, 23 (1957) (see Table I).

Liquids which have the defined degree of compatibility must still meet the requirements for molar volume of any given liquid. Molar volumes are readily calculated for any given liquid or can be ascertained from tables. We have found that solvents of the defined compatibilities must have at least minimum molar volumes which depend both on the degree of compatibility and upon the type of crystallinity which can be developed in a given polymer. The minimum volume is less for crystallizing polymers corresponding to Types C and D than for polymers corresponding to Type B and for these various types is different than for polymers of Type A.

Minimum molar volumes are set forth in Table I wherein are shown relationships of compatibility, type of polymer, and minimum molar volumes both with respect to preferred limits and wider practical limits. As will be seen, the smallest value for the minimum molar volume is 50 and preferably 75.

TABLE I

*Limiting Parameters of Solvents*

| $\delta$ | Minimum molar volumes in ml. for— | | | | | |
|---|---|---|---|---|---|---|
| | Type A | | Type B | | Types C and D | |
| | Limit | Pref'd | Limit | Pref'd | Limit | Pref'd |
| 8.0 | 109 | 110 | 106 | 114 | 50 | 75 |
| 8.5 | 122 | 135 | 121 | 135 | 70 | 95 |
| 9.0 | 134 | 160 | 136 | 157 | 90 | 117 |
| 9.3 | 142 | 175 | 145 | 170 | 102 | 130 |
| 9.5 | 137 | 164 | 128 | 158 | 90 | 115 |
| 10.0 | 122 | 137 | 85 | 129 | 60 | 78 |

It should be commented that minimum molar volumes for solvents used for developing crystallinity in polymers of Type C are less exactly known than for other types, but the values resemble those for the solvents used with Type D. While Type B polymers give rather well developed X-ray patterns, there appear to be polymers which are readily crystallized in this form and some polymers which are not so readily brought into a crystalline state. There may be minor differences, therefore, in the minimum molar volumes for the variations in the behavior of polymers of this type. If the number average molecular weight is unusually low, for example, below about 20,000, the minimum specified in the table may be somewhat reduced.

Some solvents which have acceptable compatibility values and molecular volumes and which may therefore be considered as solvents for effecting crystallization are listed below in Table II.

TABLE II

*Development of Crystallinity With Selected Solvents*

| Solvent | $V_1$ | $\delta$ | For Types | | |
|---|---|---|---|---|---|
| | | | A | B | C and D |
| acetone | 73 | 9.9 | − | − | + |
| n-butyronitrile | 87 | 9.9 | − | − | + |
| methyl ethyl ketone | 90 | 9.2 | − | + | + |
| ethoxyethanol | 97 | 9.9 | − | + | + |
| ethyl acetate | 98 | 9.1 | − | − | + |
| methyl n-propyl ketone | 106 | 8.9 | − | + | + |
| toluene | 106 | 8.9 | − | − | + |
| isopropyl acetate | 117 | 8.4 | − | + | + |
| ethylbenzene | 122 | 8.8 | − | − | + |
| methyl isobutyl ketone | 125 | 8.4 | − | + | + |
| butoxyethanol | 131 | 8.9 | − | + | + |
| n-butyl acetate | 132 | 8.5 | − | + | + |
| isobutyl acetate | 133 | 8.3 | − | + | + |
| methylcyclohexanone | 123 | 9.3 | − | − | + |
| ethoxyethoxyethanol | 135 | 9.6 | − | + | + |
| 2-heptanone | 139 | 8.5 | − | + | + |
| 3-heptanone | 140 | 8.5 | − | + | + |
| 4-heptanone | 140 | 8.4 | − | + | + |
| amyl acetate | 148 | 8.5 | + | + | + |
| 3-octanone | 156 | 8.8 | + | + | + |
| 2-octanone | 156 | 8.8 | + | + | + |

It will be noted that the successfully used solvents are chiefly liquid ketones, esters, and ethers. The results show, however, that not all of the members of these classes of compounds are useful for developing crystallinity. Solvents examined but without success in developing crystallinity include chlorinated hydrocarbons, some hydrocarbons, carboxylic acids and their anhydrides, and some higher alcohols. On the other hand, some hydrocarbons, such as ethylbenzene, have been effective in developing crystallinity, as in Type D polymers.

In the above Table II, there is indicated by + or − under columns headed by A, B, and C and D the results of screening tests conducted with the stated solvents. Samples of polymers which had been prepared by methods which had been found capable of giving polymers convertible to the respective types of crystallinity were dissolved in small portions of the various solvents by heating the mixture of solvent and polymer. The resulting solutions were cooled to 30° C. and left standing for several hours. Any solid which separated was collected and examined for crystalline character. If a precipitate of crystalline nature was thus obtained, this fact is indicated by a plus sign. A negative mark does not necessarily mean that the given solvent could not be used for developing crystallinity in some specimen of the type indicated by following another treating procedure, particularly as the solvent might permit precipitation of crystalline polymer at a lower temperature or in a different time. It is evident that some variations are encountered with different preparations of polymer and any rule formulated is only a good but not necessarily exclusive guide.

It is well known that compatibility of solvents and polymers, which substances have polar groups, are not always fully predictable. Specific effects come into play which cannot always be predicted. Thus, some highly polar solvents which have high $\delta$ values may become especially effective for crystallizing particular polymers, especially when they are of low molecular weight.

After a solvent has been selected on the basis of compatibility and molar volume with consideration for possible other factors which may come into consideration in some cases, as the glass temperature of the solvent or difference between melting point and apparent second order transition temperature of the polymer-solvent system, the solvent is used under conditions of concentration and temperature suitable for it and the polymer being treated.

Concentration is best expressed in terms of the volume fraction of polymer present in the polymer-solvent mixture. The process will operate at concentrations of crystallizable polymer ranging from less than one percent by volume to as much as about 85 percent by volume. The lowest concentration limit is one at which the melting point of polymer is not depressed below the operating temperature. The limit is lower the higher the melting point of the polymer, the poorer the solvent for the polymer, the larger the molar volume of the solvent, and the lower the operating temperature.

The upper concentration limit is merely one at which the rate of crystallization is still sufficiently rapid to bring about crystallization in a convenient time, that is to say the system is sufficiently mobile to allow crystallizing in a practical time. It will be high for solvents whose presence tends to lower the melting point only a little while lowering the glass temperature considerably.

Generally, concentrations of polymer are most convenient from about one percent by volume to about ten percent, but in some favorable cases even at 25° to 35° C. much higher concentrations are desirably employed, such as 30 to 40 percent and up to higher temperatures, for example, of 100° to 130° C., polymer concentrations up to 50 percent are desirably employed. Cases in which a polymer concentration exceeds 85 percent would be exceptional.

The temperature range for operation may vary from about 0° to 130° C. or somewhat lower or higher. The preferred operating range is 25° to 100° C. and is chosen with respect to the particular solvent and polymer and to the melting point of the particular polymer-solvent mixture, since the operating temperature need be below this melting point.

Thus, low to intermediate operating temperatures are preferred for low melting polymers, for liquids of good solvent power, i.e. with a $\delta$ value not far from 9.3 for the polymer, for solvents of low molar volume, and for low concentrations of polymer. Intermediate to high operating temperatures are desirable to increase the rate of crystallization and are preferred in the case of polymers which are slow to crystallize, of liquids of low mobility, and for high concentrations of polymer.

It is desirable that an operating temperature be chosen to give a high rate of crystallization. There is a maximum rate of crystallization in a region between the melting point and the glass temperature of the polymer-solvent system. The maximum in the curve for rate of crystallization versus temperature is higher and the peak is broader as the difference between melting point and glass temperature is greater. At low concentrations of solvent the optimum region for crystallization will generally be closer to the melting point than to the glass temperature of the polymer-solvent system. At higher solvent concentrations the optimum region for crystallization generally occurs at a temperature more intermediate between these two points. The optimum temperature will generally be lower and the range of rapid crystallization is broader as the concentration of solvent is higher, especially in the case of solvents of low glass temperature and high molar volume.

In our process the polymer-solvent mixture is held at an operating temperature for a time sufficient to permit crystallization to occur, here designated the crystallization period. This may vary from about five minutes in most favorable cases to 50 or more hours. Usually times of 30 minutes to six hours will suffice.

Polymers formed by one of the specific methods outlined above, treated with a defined solvent or mixture of crystallizing solvents, or a mixed solvent which satisfies above requirements, and freed of at least the bulk of the solvent exhibit crystallinity according to one of the patterns already described and illustrated by FIGURES 2 to 5(b).

The polymers which we have designated as of Type A giving X-ray diffraction patterns, of which FIGURE 2 is typical, are obtained by polymerizing methyl methacrylate (a) with a free radical initiator between about 0° and —75° C. or (b) with an anionic initiator in a liquid system at low temperatures (below —40° C.) in a polar, highly solvating medium, which may be liquid ammonia or other polar solvent having a $pK_a$ of at least 20, which $pK_a$ is greater than that of the conjugate ion, such as a liquid ether which is highly solvating, for example the dimethyl or diethyl ether of ethylene glycol or of diethylene glycol, in the presence of an alkali metal catalyst or alkaline earth metal catalyst or a quaternary ammonium salt of a Lewis acid of $pK_a$ 20 to 35. Polymers thus formed can be crystallized in the form we have designated as A, the polymer chains having predominantly one type of steric arrangement about the pseudo asymmetric carbon atoms, although there may be other sorts of polymer chains present.

Free radical polymerization at low temperatures is conveniently effected in a liquid system by forming a free radical in the presence of methyl methacrylate and allowing polymerization to proceed. At low temperatures common initiators such as organic peroxides or azo catalysts, of course, do not decompose to give free radicals with any detectable velocity. Free radicals can be generated, however, under the influence of ultraviolet light. A light-absorbing sensitizer greatly accelerates the process, there being useful such photosensitizers as fluoroescein or benzoin, acyloin, or other $\alpha$-carbonyl alcohol. An amount of 0.01% to 1% of one of these based on the weight of monomer is usually sufficient. Polymerization is best carried out in solution, an organic solvent such as toluene being suitable, the solvent being liquid at low temperatures. But such solvent is not essential, as methyl methacrylate can serve as its own solvent.

In place of the use of actinic light polymerization can be effected with high energy radiation such as from a $\beta$- or $\gamma$-ray source, also at low temperatures.

When an anionic initiator is used in a polar, solvating medium, polymerization for development of polymer which may be developed into our Type A must likewise be accomplished at low temperature that is below —40° C. in liquid phase, temperatures between —40° and —90° C. being generally suitable. Liquid ammonia is a very convenient medium in which to effect polymerization. Poly(methyl methacrylate) precipitates. Any traces of initiator may readily be washed away from the polymer as by use of a dilute acid in water or methanol or by treatment with ammonium chloride followed by washing with water. The washed polymer is dried, conveniently under reduced pressure.

As catalyst there may be used in this process an alkali metal or an alkaline earth metal catalyst or mixtures thereof. The catalyst may be finely divided metal or a salt of the metal formed with an acid (in the Lewis sense) with a $pK_a$ from 15 to 40. The salt may, for instance, be an amide, as formed from the reaction of one of the above metals and ammonia, particularly under the influence of an oxidizing catalyst such as an iron salt. Other alkali or alkaline earth metal salts may be used such as metal alkoxides free of alkanol, or a metal hydrocarbon, such as 9-fluorenyl lithium, butyl sodium, phenyl sodium, phenyl potassium, cyclohexyl sodium, xanthyl sodium, indenyl sodium, triphenylmethyl potassium, diphenylmethyl sodium, benzyl sodium, or comparable calcium, strontium, or barium salts. The amount of catalyst used may be from 0.01 to 0.1 mole per mole of monomer.

In place of an alkali or alkaline earth metal catalyst there may be used a quaternary ammonium salt of an acid of a $pK_a$ of 20 to 35. These quaternary ammonium salts form a new class of initiators, elsewhere more completely described by one of us. When one or more of these is used below −40° C. to initiate polymerization of methyl methacrylate, the resulting polymer is not crystalline, but becomes so on treatment with a crystallizing solvent.

The quaternary ammonium salts of weak acids have four N-substituents attached to nitrogen, which substituents taken individually are alkyl, cycloalkyl, aralkyl, or phenyl or when two N-substituents are taken together, they form a saturated divalent aliphatic chain which with the nitrogen forms a heterocycle, as in pyrrolidine, piperidine, or morpholine or alkylated rings of these types. The quaternary ammonium group is attached to a conjugate anion of an acid having a $pK_a$ of about 20 to about 35, such as indene, phenylacetylene, diphenylamine, fluorene, xanthene, triphenylmethane, or toluene.

The amount of such initiator added to methyl methacrylate may be varied from 0.01% to 10% and is preferably 0.1% to 5% of the weight of monomer. Any traces of such catalyst may be removed from polymer by washing polymer with a dilute acid, as with aqueous 5% hydrochloric acid.

Stereospecific polymers which upon treatment with a crystallizing solvent provide crystalline polymers which we have designated as of Type B and which have a steric arrangement differing from that of Type A polymers are obtainable under several sets of conditions. When poly(methyl methacrylate) is formed under the influence of metal catalyst which can form a coordinating complex with the ester carbonyl group in a non-polar, non-solvating medium, such as a liquid hydrocarbon, and in the absence of other effective polar, coordinating compounds than methyl methacrylate, the resulting polymer is crystallizable with a crystallizing solvent into a Type B polymer. When the medium has slight solvating power, resulting, for example, from the presence of not over 5% of dioxane in the total mixture, the metal catalysts providing coordinated complexes give polymers of Type B above −40° C., while below about −40° C. they provide polymers of Type D except when the Grignard reagent is a Grignard magnesium chloride reagent, in which case polymers crystallizable into Type B are obtained above about 25° C.

In a non-polar, non-solvating medium there are mixed methyl methacrylate and 0.01% to 10% of its weight of one of the metal catalysts which can form a coordinated complex with methyl methacrylate. The metal catalysts are here based primarily on lithium or the alkaline earths, including the alkaline earth metals of group IIA of the periodic system and magnesium. The catalysts may be supplied as finely divided lithium, calcium, strontium, or barium, which react with monomer, or it may be a salt of one of these metals and an acid of $pK_a$ from 15 to 40. It may also be a turbid or aged Grignard reagent formed by reacting magnesium with a hydrocarbon halide, such as bromobenzene, butyl chloride, ethyl chloride, methyl iodide, or cyclohexyl bromide in a solvating medium, such as an ether or amine, excess of solvent in which such catalyst is formed being substantially removed. In a substantially non-solvating environment the temperature for polymerization is not critical and may be in the range of about −90° to 100° C.

After the non-polar solvent, catalyst, and methyl methacrylate have been mixed and polymerization has been permitted to proceed, the resulting polymer is desirably freed of initiator by washing with a dilute acid in water or in a lower alcohol. Polymer can then be isolated and is ready for treatment with a crystallizing solvent.

When the polar solvent, such as a diethyl ether in which Grignard reagents are usually prepared, is not substantially removed or when such an ether is added to a Grignard reagent, the addition of Grignard reagent in such solvent to a non-polar solvent supplies some mild solvating power to the environment in which polymerization is to be carried out. Under these conditions polymers which are crystallizable into Type B polymer are still obtained if the temperature of polymerization is between −40° C. and 100° C. For sure formation of polymer crystallizable as Type B polymer the amount of polar, solvating solvent in the polymerizing mixture should be less than five percent of the mixture.

If the temperature of such a mixture is below −40° C. (or 25° C. with a Grignard magnesium chloride reagent), the polymer which forms is then crystallizable into Type D.

If, in place of a mixture of a non-polar, non-solvating solvent and a minor proportion of a solvating solvent, there is used a solvent which may be polar, but has but slight solvating power, there is likewise obtained with a coordinating catalyst between −40° and 100° C. polymer which upon treatment with a crystallizing solvent yields polymer of Type B. Solvents of slight solvating power include hindered ethers such as ethyl isobutyl ether or bisisobutyl ether. Such hindered ethers have little tendency to form coordinated complexes with lithium or alkaline earth metal catalysts.

Polymers which are crystallizable in the form of Type D are obtained, as indicated above, by polymerizing methyl methacrylate below −40° C. (or 25° C. with a Grignard magnesium chloride reagent) in a non-polar solvent such as toluene which contains a minor proportion of a polar solvent which forms a coordinating complex with a Grignard reagent. Polymers leading to Type D crystalline poly(methyl methacrylate) are also obtained under conditions where another coordinating metal is used having a strong tendency to coordinate with the ester carbonyl group in a liquid medium which has sufficient solvating power to compete with the ester carbonyl group for complexing with the metal catalyst. Thus, lithium, calcium, strontium, or barium salts of Lewis acids of $pK_a$ 15 to 40 below −40° C. give polymers crystallizable as Type D in a mixed solvent of a non-solvating organic liquid, such as toluene, and a coordinating organic solvent, such as dioxane, diethyl ether, dibutyl ether, tetrahydrofurane, or the dimethyl or diethyl ether of ethylene glycol or diethylene glycol, the latter forming 1% to about 10% of the solvent mixture.

Likewise, below −40° C. a weakly coordinating metal catalyst, that is an alkali metal catalyst from other than lithium, in a non-polar, non-solvating medium such as toluene gives poly(methyl methacrylate) crystallizable as Type D.

In either case metal catalyst, solvent or solvents, and methyl methacrylate are brought together below −40° C. Polymer is allowed to form, is separated, is treated to remove catalyst, and is freed of the solvent used. It is then ready for treatment with a crystallizing solvent.

We have found that polymers which we have designated as Type C are formed by initiating polymerization of methyl methacrylate below 0° C., best between —40° and —90° C., with triethyl aluminum. The polymerization is carried out in the presence of a non-polar solvent, such as toluene or other hydrocarbon which is a solvent for the system. The triethyl aluminum is used in a relatively high proportion, being present at 10% to 30% of the weight of the initial weight of monomer.

In order to obtain crystalline X-ray diffraction patterns it is not necessary that every mer entering into poly(methyl methacrylate) be in either isotactic or syndyotactic sequences. It does require that a significant proportion of mers be arranged in a regular, repeating form. It requires that there be blocks of regularly arranged mers and that these blocks be of a sufficient size to develop crystalline lattices. There may be other blocks which occur without regularity or which are disordered. Yet there must be a determining proportion of the ordered blocks if crystallinity is to be exhibited.

With the relatively large and important ester group present, there results considerable difference in the nature of the polymers from methyl methacrylate depending upon whether there is a regularity and an ordering of mers and whether the segments so ordered are present in significant proportions.

The crystallites thus developed have interacting forces which provide melting points above the softening points of amorphous polymers, which improve strength factors, and which maintain utility of the crystalline polymers over a wide range of temperature and at temperatures where atactic polymers lack strength and are tacky.

The same general methods which have been successful in providing crystalline poly(methyl methacrylate) can be applied to preparing crystalline polymers of other lower alkyl methacrylates. Adaptation of our methods to these other esters requires some slight changes in the parameters for choosing crystallizing solvents and choice of the best conditions for polymerizing each ester into a crystallizable form. These principles can also be applied to lower alkyl acrylates, but with somewhat more careful choice and adjustment of polymerizing conditions and choice and use of crystallizing solvents.

The crystalline polymers of this invention may be used in films, coatings, and moldings with advantageous results because of their unique properties. In the formation of films and coatings, solutions in a crystallizing solvent are used. The temperature of the solution may be sufficient to give a free flowing composition which is then applied and cooled below the melting point of the polymer-solvent mixture. The solvent is then taken off at a temperature below the melting point. Also, a solution may be used in a mixture of a crystallizing solvent and a non-crystallizing solvent which is more volatile than the former, such as chloroform. The presence of the latter solvent controls the range in which gels are formed. After such a solution is applied for forming a coating or producing a film, the non-crystallizing solvent is removed at any convenient temperature. The other solvent is then taken off below the melting point.

Lacquers have been applied to clean glass surfaces and coatings slowly formed thereon. These have exhibited remarkable adhesion and because of the nature of the crystalline polymer deposited have provided protectant films, as on flash bulbs.

Crystalline poly(methyl methacrylate) has advantageous applications because of properties found therein which are lacking in the previously known amorphous polymers. The crystalline forms lack the sudden softening point of the amorphous polymers and have melting points considerably above such softening point. Other distinctive properties are illustrated by the curves for torsional modulus versus temperature. The usual amorphous polymer shows an abrupt change in modulus as temperature increases with low values for the modulus above the glass temperature. Crystalline poly(methyl methacrylate) shows a first rapid change in modulus which at least in the case of Type A crystals is not very different in location from the point at which the abrupt change begins for amorphous polymer. This modulus does not fall far in the case of the crystalline polymers before a plateau is reached which extends over a considerable range of temperature after which a second rather abrupt drop in modulus occurs. In this range the polymer exhibits both crystalline and rubbery characteristics so that films remain flexible and tough over this range of temperature. Since the effect of plasticizers is to lower the temperature at which the plateau is reached, it becomes possible now to use chemical plasticizers with poly(methyl methacrylate). The range over which rubbery and crystalline characteristics can be enjoyed is about as extensive as for unplasticized crystalline polymer, but this range begins and ends at lower temperatures.

Introduction of crystallinity into poly(methyl methacrylate) thus drastically changes the character of the polymer in the range of temperature between the glass temperature and the melting point of the crystallites. The crystallites can be thought of as cross-links involving many polymer chains at a single junction. The cross-links are mechanically stable until melting occurs. Moreover, the crystallites are denser and harder than surrounding rubbery polymer which exists in regions between crystallites.

Our invention is further described in the following examples which are given for purposes of illustration and not by way of limitation. Parts are by weight unless otherwise designated. The examples will supply more details of the procedures which can be used to produce crystallizable polymers.

EXAMPLE 1

(a) There are mixed 14 parts of methyl methacrylate, 30 parts of toluene, and 0.27 part of benzoin. This mixture is warmed under reduced pressure to remove gases and blanketed with nitrogen. It is cooled to —70° C. and then the vessel containing the mixture is placed in a methanol bath maintained at —50° C. The mixture is exposed to ultraviolet light for 14 hours, a General Electric "Uviarc UA-3" (360 watts) being used and the irradiated solution being in Pyrex glass at about six inches from the light source. The resulting solution is poured into ten volumes of methanol. Polymer precipitates. It is separated, washed several times with methanol, and dried at steam bath temperatures.

(b) A portion of two parts of this polymer is taken up in 20 parts of 4-heptanone and the mixture is heated to 100° C. All polymer dissolves. The resulting solution is maintained at 30° C. for five hours. Turbidity soon develops and then polymer separates. It is filtered off and dried at room temperature.

(c) The polymer has a molecular weight (viscosity average) of 59,000. The polymer as first obtained above shows only amorphous X-ray scattering. The polymer obtained after treatment with 4-heptanone gives a definite X-ray diffraction pattern corresponding to Type A. Examination of the polymer samples by infrared spectroscopy demonstrates that they are poly(methyl methacrylate). No impurities are evident by standard infrared spectroscopy.

In place of the benzoin used above as a photo-sensitive initiator, there may be used other such initiator. Thus, benzoin may be replaced by azobisisobutyronitrile, dimethyl azobisisobutyrate, acetoin, biacetyl, acetyl acetone, or fluorescein. In place of toluene as the solvent there may be used other solvents which give liquid solutions of methyl methacrylate below —40° C., including lower aliphatic hydrocarbons even though polymer may be precipitated therefrom. In this type of polymerization it is not material whether the solvent be polar or non-polar provided it is inert. The critical factor is that polymerization be effected at low temperatures for producing crystallizable polymer.

Repetition of the procedure of (a) above at −40° C., −20° C., and between −5° and 0° C. yields polymers which as obtained give only amorphous X-ray scattering but which after treatment with 4-heptanone or other crystallizing solvent at a crystallizing temperature yield crystalline polymers of Type A. The polymer thus prepared at about 0° C. proved to be somewhat more critical as to crystallizing conditions. It nevertheless crystallizes with solvent treatment, 4-heptanone being effective at about 20° C.

Free-radical polymerization may also be effected without the presence of solvent. Thus, 15 parts of methyl methacrylate and 0.06 part of benzoin are cooled to −48° C. and exposed to ultraviolet for 15 hours from two 15-watt Sylvania Black Lamps as light source at about six inches from the Pyrex container. In this time conversion was 11% to poly(methyl methacrylate), which as obtained gave only amorphous X-ray scattering. Upon treatment with 4-heptanone at 30° C. there was obtained a polymer fraction containing crystallites of Type A.

Other free-radical methods effective at low temperatures may be applied to the polymerization of methyl methacrylate with development of a crystallizable polymer which is oriented upon swelling or gelling with a crystallizing solvent, provided polymerization is accomplished in the cold (0° to about −75° C.) and in liquid phase. These methods include β-radiation and use of high energy particles.

EXAMPLE 2

(a) Liquid ammonia is distilled over sodium and 200 parts of distillate is collected in a vessel equipped with a mercury-sealed stainless steel stirrer, a gas inlet tube, a gas outlet tube protected by a mercury bubbler, a dropping funnel, and a sampling tube for introducing solids. To the distilled liquid ammonia is added through the sampling tube 0.07 part of sodium. Oxygen is slowly introduced into the liquid ammonia from a gas buret until the blue color developed upon addition of sodium is discharged. The resulting solution contains sodium amide, which serves as the initiator.

Addition is now made of 40 parts of methyl methacryate to the liquid ammonia containing anionic initiator at −70° C. Polymer forms at once and separates as a finely divided, white solid. About five minutes after addition of monomer there is added 0.1 part of ammonium chloride. The slurry is then filtered and the polymer is thoroughly washed with water and dried under vacuum at 50° C. The dry weight of polymer is 36 parts. The polymer has a molecular weight (viscosity average) of 85,000.

(b) A portion of 0.5 part of this polymer is shaken for 16 hours in nine parts of 4-heptanone at 25°–30° C. The mixture is centrifuged and the polymer is dried under vacuum at 50° C. The dried polymer amounts to 0.26 part, there being held in solution 0.24 part.

(c) There is prepared at 120° C. a 5% solution of the polymer obtained in (a) in methyl hexyl ketone. The hot solution is cooled to 30° C. and held at this temperature for 24 hours. Polymer precipitates. It is removed by centrifuging and is washed with fresh methyl hexyl ketone. The thus separated polymer amounts to 55% of the polymer dissolved.

(d) The above polymers are examined by X-ray methods. The polymer obtained in (a) displays the typical scattering of amorphous poly(methyl methacrylate). The polymers obtained by the solvent treatments are both clearly crystalline in character, giving an X-ray diffraction pattern of Type A.

The crystalline polymers give infrared absorption which is typical of this type of poly(methyl methacrylate) crystallites. No impurities were detectable by standard infrared spectroscopy.

Polymer obtained by the method described in (a) is fractionated into 16 parts by employing a 0.5% solution of polymer in acetone and precipitating with petroleum ether. The precipitates thus obtained are amorphous. They yield crystalline polymer when treated as above with 4-heptanone or with methyl hexyl ketone. The crystalline fractions give distinctive infrared spectra. During this work it was observed that the amount of crystalline polymer is time-dependent. For instance, after the polymer separating in 24 hours was removed, more crystalline polymer separated.

Soluble fractions from the above treatment were evaporated under reduced pressure to give amorphous solids. These were treated as above with 4-heptanone at 30° C. to yield crystalline material of Type A.

The ratio of the viscosity average molecular weight to number average molecular weight for the polymer as first formed is 1.46:1. The molecular weights of the respective fractions vary from about 16,000 to 160,000, but with a majority of the samples having high molecular weights. A comparison of the molecular weight data for the fractions against molecular weight of the usual free-radically polymerized poly(methyl methacrylate) shows that there is an unusually narrow distribution of molecular sizes.

Repetition of the steps of Example 2(a) in an all-glass apparatus with reagents and catalyst free of any iron also gave polymers which were crystallizable with the aid of a crystallizing solvent, provided the temperature of polymerization was below −40° C. Polymer formed −33° C. remained amorphous despite all attempts to force it into a crystalline state.

(e) To a stainless steel pressure vessel cooled to −70° C., there are charged 30 grams of sodium metal and 15 liters of anhydrous liquid ammonia. The vessel is closed and brought to about 30° C., at which point the iron-catalyzed reaction of sodium and ammonia occurs rapidly to produce a saturated solution of sodium amide in liquid ammonia. This solution is pumped through a 35 micron glass filter and through a cooling coil into a stirred reactor held at −70° C. Simultaneously, a stream of methyl methacrylate is pumped into the reactor at a rate to maintain a ratio by weight of ammonia to methyl methacrylate of 10:1. Poly(methyl methacrylate) forms rapidly as a solid phase. The resulting slurry is continuously removed to a receiver where polymer is filtered off. The polymer is well washed with deionized water and dried under vacuum at 50° C. Conversion to polymer is essentially quantitative. The viscosity average molecular weight of the polymer is 70,000.

To one part of this polymer there is added 25 parts of 4-heptanone. The mixture is shaken at 30° C. for 24 hours. Some polymer remains undissolved. This is separated by centrifuging. It amounts to 0.25 part. It is washed with 15 parts of 4-heptanone and dried under low pressure. The dried polymer gives an X-ray diffraction pattern of Type A.

Another one part portion of the above polymer is taken up in 25 parts of 4-heptanone and mixture is heated to 120° C. with solution of polymer. The solution is cooled to 30° C. and held at this temperature for a period of 20 hours. After about 30 minutes there develops turbidity; after about 40 minutes more the presence of distinct particles can be noted, these effects being typical of crystallization of polymers from solution. The amount of crystalline polymer obtained is 23% of the original polymer.

The procedure is followed with methyl hexyl ketone as solvent. The yield of crystalline polymer is 40%. These polymers also give X-ray diffraction patterns characteristic of crystalline poly(methyl methacrylate) of Type A.

Phase studies on solutions of the polymer indicate an extrapolated value for the melting point of the crystalline polymer in excess of 200° C. At concentrations of 30% to 50% a gel of a crystalline polymer forms at 30° C. throughout the solution in 4-heptanone. These gels are of high viscosity and show thixotropic properties. When they are heated above 40° C., they abruptly lose their thixotropic character and become Newtonian fluids of low viscosity.

An amorphous poly(methyl methacrylate) of a molecular weight of about 70,000 provides above its glass temperature a very soft polymer which in effect is but a viscous liquid of little strength and of no dimensional stability. In contrast the above crystalline polymer of a molecular weight of about 70,000 remains form-stable for a substantial elevation in temperature above its glass temperature and in this range is a tough, cohesive rubber with high impact strength and excellent resistance to tear.

Thus, the crystalline poly(methyl methacrylate) is useful in films, foils, and moldings at temperatures far above those which have been heretofore accepted as impractical for the previously known poly(methyl methacrylate).

Another portion of the polymer is treated with amyl acetate at about 0° C. for 16 hours. The swollen undissolved polymer is separated, washed, and dried. It gives a definite X-ray diffraction pattern which corresponds to a poorly developed pattern of Type A.

EXAMPLE 3

Anhydrous liquid ammonia is distilled into a vessel held at −70° C. and equipped with stirrer, thermometer, dropping funnel, and inlet tube through which is maintained a constant flow of dry nitrogen. The vessel contains 140 ml. of dry ammonia. To it is added barium metal in an amount of 0.19 gram. A blue solution forms. Thereto is slowly added 20 grams of methyl methacrylate. The blue color disappears very rapidly and solid polymer separates. The reaction mixture is then poured into an excess of methanol. The polymer is filtered off, washed thoroughly with water, and dried under vacuum at 50° C. The yield of polymer is 67%. It has a viscosity average molecular weight of 640,000. It gives only amorphous X-ray scattering.

The portion of five grams of this polymer is shaken in 100 ml. of 4-heptanone at 25° C. for 18 hours. The insoluble polymer is filtered off and dried. It is crystalline as shown by its X-ray diffraction pattern of Type A.

Another one part portion of the above polymer is taken up in 2.8 grams of amyl acetate and the mixture heated to reflux. The hot solution is filtered into a centrifuge tube through a sintered glass filter. The centrifuge tube is held at 30° C. for 20 hours. The solution is viscous. It is cooled to 0° C., where a turbid gel forms. The gel disappears when the tube is brought to 30° C. The solution is again cooled to 0° C. whereupon a viscous gel again forms. After three hours at 0° C. the gel is subjected to low pressure, a cold trap being used, and solvent is stripped off during a period of six hours. The resulting polymer exhibits a pattern essentially of Type A.

Another one part portion of the above polymer is placed in 25 parts of 4-heptanone. The mixture is heated with solution of the polymer. The hot solution is cooled to 25° C. and left standing for one hour. The solid which separates is taken off by centrifuging, washed with fresh 4-heptanone, and dried at 50° C. under low pressure. The resulting polymer is crystalline as demonstrated by giving an X-ray diffraction pattern of Type A.

Films formed from cooled solutions of this polymer are unusually tough, have excellent tear strength, and exhibit flexibility, which can be increased by addition of conventional plasticizers without loss of desirable properties.

In place of barium amide there may be used other alkaline earth metal catalysts. Thus, under the above conditions, a catalyst from calcium or strontium also leads to polymers crystallizable as Type A.

EXAMPLE 4

Liquid ammonia is distilled from sodium and 250 parts of distillate is collected in a vessel equipped with a mercury-sealed stirrer, a gas inlet tube, a gas outlet tube protected by a mercury bubbler, and a dropping funnel, and containing 0.49 part of potassium metal. A stream of anhydrous nitrogen gas is passed through the reaction vessel during this and all subsequent operations.

The contents of the reaction flask are warmed to −33° C., and 0.03 part of ferric nitrate is added. After approximately one hour the blue color of the metal solution disappears, indicating that the iron-catalyzed formation of potassium amide is complete.

The reaction mixture is cooled to −73° C., and a mixture of 15 parts of methyl methacrylate and 15 parts of diethyl ether is added from the dropping funnel. Forty-five minutes are required for the addition in order to maintain the temperature of the reaction below −70° C. About five minutes after addition of the monomer is completed there is added about 0.1 part of ammonium chloride. The polymer slurry then is filtered, and the solid filter cake is washed thoroughly with water and is dried in a vacuum desiccator. Eleven parts of poly(methyl methacrylate) having a viscosity average molecular weight of 40,000 is obtained. Upon treatment of this polymer with 4-heptanone at 30° C. for ten hours, separation of polymer and solvent and drying of polymer under reduced pressure, the polymer becomes definitely crystalline and gives an X-ray diffraction pattern of Type A.

EXAMPLE 5

To a solution of 18.7 grams of methyl methacrylate in 100 ml. of toluene at 0° C. under a nitrogen blanket there is added 4.3 grams of triethyl aluminum by means of a syringe which prevents exposure to air or moisture. The reaction mixture is stirred at 0° C. for 21 hours. It is then poured into 10 volumes of methanol. Polymer is precipitated as a solid. It is collected on a filter, washed with methanol, and dried under reduced pressure. A portion of five parts is shaken in 4-heptanone for three hours at 30° C. The insoluble portion of polymer is separated and dried. It is definitely crystalline by its X-ray diffraction pattern, which is of an individual type which we have designated Type C.

EXAMPLE 6

A solution is prepared from 200 parts of methyl methacrylate in about 400 parts of toluene in a reaction vessel equipped with a mechanical stirrer reflux condenser, thermometer, inlet and outlet tubes for supplying inert gas, and with a device by which catalyst is injected anaerobically into the vessel. The vessel is thoroughly flushed with dry nitrogen and cooled to −60° C. Then ten parts of a 0.36 M solution of 9-fluorenyl lithium in diethyl ether is injected. The mixture is stirred at −60° C. After twenty minutes a second portion of ten parts of the 9-fluorenyl lithium solution is injected. Polymerization proceeds rather rapidly with the temperature of the mixture rising to −51° C. An addition of 120 parts of toluene is made to maintain fluidity. After an hour another portion of ten parts of the catalyst solution is added. Additional toluene is supplied to reduce the polymer concentration to 1.7%. This diluted solution is poured into givorously agitated methanol. Polymer is thus precipitated. It is collected on a filter and dried. The polymer is purified by solution in acetone under reflux, filtration, and precipitation in water. In spite of some difficulties in handling the solution a yield of 89.5% of polymer is obtained. The intrinsic viscosity of this polymer corresponds to an average molecular weight of 800,000. This polymer as obtained gives only amorphous scattering when examined by X-ray techniques.

A solution of five parts of polymer is made in 95 parts of 4-heptanone at reflux temperature. The solution is cooled to 33° C. and left standing for four hours. A precipitate of polymer forms. It is separated by centrifuging, washed with 4-heptanone, and dried at 50° C.

The recovered polymer amounts to 99% of the polymer taken. This polymer gives an X-ray diffraction pattern of Type D.

The above procedure is repeated with methyl hexyl ketone with an entirely comparable result. The dried polymer likewise gives an X-ray diffraction pattern of Type D.

Phase studies of these polymers in the above ketones permit extrapolation of the melting point of pure polymer above 170° C. Solutions of polymer in these ketones when cooled to room temperature from rigid gels at concentrations of 2% to 10%. When these gels are heated, they undergo an abrupt transition to Newtonian fluids of low viscosity in the range of 60°–80° C.

Repetition of treatment of portions of polymer with a series of other solvents, including 2-heptanone, methylcyclohexanone, methyl isobutyl ketone, isobutyl acetate, n-butyl acetate, or isopropyl acetate likewise yields crystalline polymer. The temperature at which crystallization is carried out can be varied over a considerable range provided that the crystallizing temperature is below the melting point of the polymer-solvent system.

EXAMPLE 7

Trityl tetramethylammonium is prepared by treating 2.4 parts of tetramethylammonium bromide with 2.1 parts of trityl sodium (triphenylmethyl sodium) in 15 parts of diethyl ether at 25° C. under an atmosphere of nitrogen. The trityl tetramethylammonium is formed as a solid which is separated by filtration and repeatedly washed with anhydrous ether under a blanket of nitrogen. This removes any remaining trityl sodium. The washed solid is suspended in 200 parts of dry toluene and to this mixture held at 50° C. is added 50 parts of methyl methacrylate. The mixture is stirred and kept at 50° C. for three hours. The resulting viscous yellow reaction mixture is poured into ten volumes of methanol. Polymer separates as a solid and is collected on a filter. The polymer is purified by being washed with hot 5% hydrochloric acid and with deionized water. It is dried at 50° C. The polymer thus obtained gives only amorphous X-ray scattering.

A mixture of five parts of the dried polymer and 100 parts of 4-heptanone is heated under reflux with solution of the polymer. The solution is cooled to 30° C. and left standing for 24 hours. It is centrifuged and the solid polymer thus separated is washed with 4-heptanone and dried under low pressure. This polymer now gives a distinctly crystalling X-ray diffraction pattern of Type D.

EXAMPLE 8

A suspension is prepared of 44 parts of 9-fluorenyl tetramethylammonium in toluene by reacting equimolar quantities of tetramethylammonium bromide and 9-fluorenyl lithium at 25°–30° C. in 2500 parts of anhydrous toluene. To this suspension is slowly added 500 parts of methyl methacrylate. The temperature of the mixture rises to 40° C. and a red-orange color develops. The reaction mixture is allowed to stand 18 hours and is then poured into a large volume of methanol. Polymer separates. It is collected and purified by solution in toluene and reprecipitation with methanol. It is dried at 50° C. The polymer thus obtained gives an amorphous X-ray pattern.

A five part portion is treated with 4-heptanone by the same method used in Example 7. The polymer now is distinctly crystalline and gives an X-ray diffraction pattern of Type D.

EXAMPLE 9

A solution of 50 parts of methyl methacrylate in 200 parts of anhydrous diethyl ether is placed in the reaction equipment used in Example 6. The vessel is flushed with nitrogen and cooled to −70° C. Then seven parts of a 0.7 M solution of trityl sodium in ether are injected. A pale yellow solid separates as this initiator solution is added. The reaction mixture is filtered. The solid polymer is dissolved in benzene and precipitated when the benzene solution is poured into petroleum ether. The polymer is further purified by being stirred in hot water for two hours. The washed polymer is filtered and dried at 50° C. The yield of polymer is quantitative. It has a viscosity average molecular weight of 90,000. As obtained, it gives only an amorphous X-ray diffraction pattern.

Portions of this polymer are treated with 4-heptanone, methyl hexyl ketone, and amyl acetate as in the previous examples. In each case the polymer then obtained provides a crystalline X-ray pattern which is a variation of Type D and similar to the pattern obtained from a polymer of Examples 6, 7, and 8.

EXAMPLE 10

A solution of 50 parts of methyl methacrylate in 200 parts of pure anhydrous diethyl ether is placed in a reaction vessel equipped much like that of Example 9. The apparatus is swept with nitrogen and cooled to −65° C. with solid carbon dioxide and acetone. There is then injected five parts of 0.8 M solution of 9-fluorenyl lithium in diethyl ether. A solid polymer begins to form almost at once. The mixture is stirred for one and one-half hours and poured into ten volumes of methanol. The polymer is filtered off, washed with methanol, and dried in the air. The dry polymer is stirred in hot water for five hours to remove colored and inorganic impurities.

A 5% solution of polymer in 4-heptanone is prepared by refluxing. The solution is cooled and held at 30° C. for five hours. The mixture is centrifuged to give a 32% yield of polymer when dry. This polymer gives a definite X-ray diffraction pattern, showing crystallinity. It is of Type D and similar to the patterns obtained in the previous example. The molecular weight is about 29,500 by viscosity methods.

EXAMPLE 11

Fifty parts of methyl methacrylate and 200 parts of anhydrous toluene are placed in a reaction vessel equipped with a mechanical stirrer, thermometer, reflux condenser, and inlet and outlet tubes for nitrogen gas. One neck of the reaction flask is covered with a rubber serum bottle cap. The entire apparatus is flushed thoroughly with dry nitrogen, and 10 parts of a filtered 2.33 M phenylmagnesium bromide solution in diethyl ether is introduced during five minutes by means of a hypodermic syringe inserted through the serum bottle cap. The temperature of the reaction mixture is maintained at 25° C. throughout the addition of initiator and for three hours thereafter.

The viscous reaction mixture is poured into eight volumes of stirred methanol, and the white solid which separates is removed and dried overnight in a vacuum desiccator. Sixteen and one-half parts of poly(methyl methacrylate) are obtained. This material is completely freed of residual inorganic salts by refluxing for one hour with 5% methanolic hydrochloric acid, washing with methanol, and drying.

This purified poly(methyl methacrylate) dissolves readily in hot 4-heptanone, but separates almost quantitatively upon cooling to 30° C. The precipitate obtained in this manner is shown by X-ray diffraction to be crystalline poly(methyl methacrylate) of the type designated as B.

After solvent treatment induced crystallinity of Type B into this polymer, a two gram aliquot is extruded into an oriented, crystalline Type B, monofilament fiber. The powdered crystalline polymer is put in a button mold, the cavity of which connects to a .027 x .035″ orifice. The filled mold is placed in a steam heated hydraulic press, and the mold and its contents are heated before pressure is applied to the sample. When the temperature of the mold rises to 113° C., pressure is applied, and the polymer is extruded from the orifice as a fiber at a rate of 0.81" per minute. The pressure within the mold is approximately 27,000 p.s.i. The extruded fiber is simultaneously restrained with a 150 gram weight to prevent relaxation and retraction. The fiber is held under this tension until it cools to room temperature. Under these conditions a fiber with a cross section .030 x .040" is made. This fiber gives an X-ray diffraction pattern of Type B in a highly oriented state.

It should be commented that the above temperature of extrusion is chosen to be above the glass temperature of this particular type of polymer, but below its melting point, since it has been observed that at temperatures below this point flow can occur with retention of crystallinity, whereas above this point crystallinity is lost.

(a) Fifty parts of methyl methacrylate and 750 parts of anhydrous toluene are placed in a flask equipped with a mechanical stirrer, thermometer, and inlet and outlet tubes for nitrogen gas. One neck of this flask is covered with a rubber serum bottle cap. The entire apparatus is flushed with dry nitrogen and the contents are cooled to −40° C. by partial immersion in a bath of acetone and solid carbon dioxide.

A suspension of 1.29 parts of 9-fluorenyl lithium in 30 parts of benzene, prepared by the reaction of fluorene with n-butyl lithium at 80° C., is added by means of a hypodermic syringe inserted through the serum bottle cap. A rapid polymerization occurs with a marked increase in the viscosity of the reaction mixture and a six degree rise in temperature. After one hour at −40°±6° C., the reaction mixture is poured into a large volume of vigorously agitated methanol. The precipitated polymer is dried, dissolved in 635 parts by weight of acetone, and reprecipitated by pouring into about 7000 parts of water. The pure polymeric material thus obtained is dried at 30° C. in a vacuum oven for 24 hours. Forty-two parts of poly(methyl methacrylate) having an intrinsic viscosity in benzene at 30° C. of 0.490 dl./g. corresponding to an average molecular weight of 170,000, is obtained by this procedure.

A portion of this polymer is dissolved at 5% concentration in hot 4-heptanone, and the solution is poured onto a hot (50° C.) mercury surface. Most of the solvent is permitted to evaporate in the air at room temperature, and the remainder is removed by treatment at 120° C. in a vacuum oven. In this manner there is obtained a cast film which is shown by X-ray diffraction measurements to be crystalline polymethyl methacrylate) of the type designated as B. A typical X-ray diffraction pattern displayed by Type B crystalline polymer is shown in FIGURE 3(a).

The polymer can be degraded at elevated temperatures (about 300° C.) in a vacuum system in a manner identical with conventional amorphous poly(methyl methacrylate) giving essentially pure monomeric methyl methacrylate as shown by mass spectrometry, infrared spectroscopy, and gas chromotography. This test was applied to representative polymers of the various types of poly(methyl methacrylate) to confirm in each case that the new type of polymer at hand was in fact based on methyl methacrylate.

The film cast from 4-heptanone is unusually tough and retains its desirable properties up to about 140° C. Whereas, conventional poly(methyl methacrylate) exhibits a sharp decrease in modulus to an extremely low value when heated above its glass or apparent second order transition temperature of about 100°–105° C., this crystalline sample remains a tough and flexible material of high modulus to much higher temperatures and loses its strength only when heated at a temperature sufficient to melt the crystallites, here about 150° C.

When a hot 5% solution of equal parts of this polymer and of a poly(methyl methacrylate) prepared by a high temperature free-radical polymerization is cooled to 30° C. and allowed to stand, the insoluble polymer which separates is found by X-ray diffraction to be of the type designated as D. Thus, whether crystallization occurs in forms B or D appears to depend on the purity of the material—and the presence of non-crystallizable chains in solution favoring the formation of crystallites of the Type D structure.

A portion of the original polymer is dissolved in 4-heptanone by warming equal parts by weight of polymer and solvent. This solution is poured when hot on a mercury surface maintained at 50° C. A film forms. After about 48 hours the film is mechanically strong and coherent, but still retains a few percent of solvent. The X-ray pattern at this time is that of a poorly developed Type D modification. The specimen is now placed in a vacuum oven and the temperature is raised gradually over a period of one week to 95° C. The film is maintained at the 95° C. temperature for four more days. At the end of this drying and annealing period the sample is removed and examined by X-ray diffraction. The diffraction pattern is then found to be that of a typical Type B modification.

(b) A solution of 11.5 parts of fluorene in 250 parts of purified, freshly-distilled dioxane is placed in a flask equipped with a stirrer, reflux condenser, and inlet and outlet tubes for nitrogen gas. One neck of the flask is covered with a rubber serum bottle cap. The apparatus is flushed with nitrogen, and 37.3 parts of a 1.69 M solution of n-butyl lithium in petroleum ether is added by means of a hypodermic syringe inserted through the rubber cap. A bright orange, finely divided solid separates almost immediately. In a separate experiment, it has been shown that this solid is a complex containing one mole of 9-fluorenyl lithium and two moles of dioxane.

Fifty parts of this slurry is transferred by means of a hypodermic syringe to a 500 ml. flask equipped in a manner similar to that described above. The orange solid is permitted to settle, the supernatant liquid is removed with a hypodermic syringe, and 50 parts of anhydrous toluene is added. The solid again is allowed to settle, and the supernatant liquid is removed as before. This washing procedure is repeated three times, then 250 parts of toluene is added, and the suspension is cooled to −60° C.

To this suspension of the dioxane complex of 9-fluorenyl lithium in toluene is added 50 parts of methyl methacrylate. A vigorous, exothermic reaction ensues immediately, and the temperature of the reaction mixture rises to −20° C. After one hour the viscous solution is diluted with 300 parts of toluene and poured slowly into ten volumes of vigorously-agitated methanol. The polymer which precipitates is removed by filtration and is dried. Forty parts of poly(methyl methacrylate) having a viscosity average molecular weight of 66,000 is obtained.

A 5% solution of this polymer in hot 4-heptanone is cooled to 30° C. and held at that temperature for twenty-four hours. The solid polymer which separates is removed by filtration, washed with fresh 4-heptanone, and dried; the insoluble product amounts to 35% of the original polymer. It exhibits an X-ray diffraction pattern of the type designated as D.

The conditions employed for the preparation of this polymer differs from those used in section (a) of this example in that the lithium ion is solvated to some extent by the dioxane. Thus, the conditions are less favorable for production of long segments of uniform steric structure. It is not surprising, therefore, that the product crystallizes not as Type B polymer, but in the D modification, already shown in Example 12(a) to result when chains which normally crystallize as Type B are deliberately mixed with conventional, amorphous poly(methyl methacrylate).

(c) Two hundred and fifty parts of anhydrous ammonia, distilled from sodium, is condensed in a 500-ml. flask equipped with a mechanical stirrer, dropping funnel, and inlet and outlet tubes for nitrogen gas, and immersed in a solid carbon dioxide acetone bath. There is added 50 parts of a 0.25 M solution of 9-fluorenyl lithium in diethyl ether, and the temperature is maintained at −70° C. while 25 parts of methyl methacrylate is added through the dropping funnel. A vigorous exothermic reaction occurs, and a white solid separates. After twenty minutes the solid polymer is removed by filtration, washed with water, and dried in a vacuum desiccator.

The dry polymer represents a 92% conversion and has a viscosity average molecular weight of 72,000. Examination by X-ray diffraction techniques shows it to be amorphous. One part of this polymer is shaken at room temperature for 24 hours with 20 parts of 4-heptanone. The insoluble fraction is separated, washed with 4-heptanone, and dried; X-ray diffraction data show that this fraction is crystalline poly(methyl methacrylate) of the type designated as A.

In a similar manner, the use of the dimethyl ether of ethylene glycol as the solvent for low temperature polymerizations initiated by 9-fluorenyl lithium produces poly(methyl methacrylate) which crystallizes upon suitable solvent treatment in Type A. Both ammonia and the dimethyl ether of ethylene glycol are capable of solvating the lithium ion to a high degree, so that in these polymerizations propagation by a free ion, rather than by an ion pair, occurs. Such a propagation mechanism, at low temperatures, leads to polymers which crystallize in Type A.

In the above example are illustrated polymerization conditions which lead to polymers crystallizing, upon suitable solvent treatment, in the three types designated as A, B, and D. It is apparent that conditions under which chain growth by an unsolvated, undissociated ion pair occurs, as illustrated in section (a) of this example, favor production of polymers which crystallize in Type B. Where propagation occurs by growth of a free, dissociated ion, as illustrated in section (c), or of a free radical, the polymers which result crystallize as Type A, provided only that the polymerization temperature is sufficiently low.

One of the interesting properties exhibited by polymers of Type B is their lower glass temperature as compared to that of conventional amorphous poly(methyl methacrylate). The curves for log torsion modulus versus temperature of Type B polymers show two inflection points. Between these there is a considerable range of temperature in which these polymers exhibit good flexibility coupled with good strength. This behavior is also exhibited by Type D polymers. This behavior indicates a close relationship between Type B and Type D polymers.

Polymers which crystallize in Type D result from certain polymerization conditions intermediate between the two extremes noted above. It is also conceivable that under intermediate conditions which permit favorable competition of the two growth mechanisms there may result polymers which do not crystallize readily, since such polymers would be expected to contain chains having a relatively disordered arrangement of steric configurations at the asymmetric carbon atoms.

EXAMPLE 13

(a) Fifty parts of methyl methacrylate and 200 parts of anhydrous toluene are placed in a reaction vessel equipped with a mechanical stirrer, thermometer, and inlet and outlet tubes for nitrogen gas. One neck of the reaction flask is covered with a serum bottle cap. The entire apparatus is flushed thoroughly with dry nitrogen, and the contents are cooled to −50° C. by partial immersion in a "Dry-Ice" acetone bath. Twenty parts of a 3 M solution of n-butylmagnesium chloride in diethyl ether, which had previously been prepared from magnesium metal and n-butyl chloride and filtered before use, is introduced by means of a hypodermic syringe inserted through the serum bottle cap.

After being stirred for eighteen hours at −50° C., the reaction mixture is extremely viscous. It is diluted with 300 parts of toluene and the diluted solution is poured into about 3000 parts of vigorously agitated methanol. The solid polymer which separates is removed by filtration and shaken for three hours with a solution of 30 parts of concentrated hydrochloric acid in 270 parts of methanol. The slurry then is filtered, and the solid product is washed with methanol and dried in a vacuum oven at 50° C. There is obtained 29.1 parts of poly(methyl methacrylate) having a viscosity average molecular weight of 40,000. This material is shaken for 16 hours at 30° C. in 4-heptanone and dried at 50° C. in vacuo.

When examined by X-ray diffraction techniques this polymer is found to give an X-ray diffraction pattern of Type D.

(b) After solvent treatment has induced crystallinity of Type D into this polymer, a two gram aliquot is extruded into an oriented, crystalline Type D, monofilament fiber. The powdered crystalline polymer is put in a button mold, the cavity of which is connected to a .027 x .035" orifice. The filled mold is placed in a hydraulic press with steam heated platens, and the mold and its contents are heated before pressure is applied to the sample. When the temperature of the mold rises to 152° C. (below the melting point of this sample), pressure is applied and the polymer is emitted from the orifice as a fiber. The pressure within the mold is approximately 32,000 p.s.i. The extruded material is maintained under tension with a 50 gram weight, and the fiber is held under this tension until it cools to room temperature. The rate of extrusion is 1.72 inches per minute to give a 0.015 x 0.019" fiber. An X-ray diffraction pattern of Type D in a highly oriented state is obtained, as shown, for example, in FIGURE 5(b).

EXAMPLE 14

A solution of 50 parts of methyl methacrylate and 200 parts of anhydrous n-heptane is placed in a reaction vessel equipped with a mechanical stirrer, thermometer, reflux condenser, and inlet and outlet tubes for nitrogen gas. One neck of the reaction flask is covered with a rubber serum bottle cap. The entire apparatus is flushed thoroughly with dry nitrogen, and the contents are heated to 90° C.

Ten parts of a 2.33 M solution of a Grignard reagent, prepared from bromobenzene and magnesium metal in diethyl ether, stored for about two weeks, and freed of material precipitating during storage, is added by means of a hypodermic syringe inserted through the rubber cap. A white precipitate of poly(methyl methacrylate) begins to separate immediately. The reaction mixture is maintained at 90° C. with stirring for two hours after addition of the initiator, and then is allowed to cool to room temperature.

The polymeric product is removed by filtration, and is freed of inorganic materials by agitating at room temperature for twenty-four hours with a solution of 20 parts of concentrated hydrochloric acid in 100 parts of methanol. The slurry is filtered, and the solid is washed repeatedly with fresh methanol and dried. There is obtained 36 parts of poly(methyl methacrylate) having a viscosity average molecular weight of 190,000.

The polymer is stirred with excess 4-heptanone for 16 hours and freed of solvent by warming to 50° C. under low pressure. This polymer shows X-ray diffraction spacings of both Type B and Type D polymers. It would appear that the product here is a mixture of both types of poly(methyl methacrylate).

We claim:

1. A process for preparing crystalline poly(methyl methacrylate) which comprises (1) polymerizing methyl methacrylate in liquid phase in the presence of a polymerization initiation system from the class consisting of
(a) free radical initiator between 0° and —75° C.,
(b) an alkali metal polymerization initiator in liquid ammonia below —40° C.,
(c) an alkali metal polymerization initiator in a liquid ether of a $pK_a$ of at least 20 below —40° C.,
(d) an alkaline earth metal polymerization catalyst in liquid ammonia below —40° C.,
(e) an alkaline earth metal polymerization initiator in a liquid ether of a $pK_a$ of at least 20 below —40° C.,
(f) a quaternary ammonium salt of an acid which has a $pK_a$ from 20 to 35 below —40° C. in a liquid ether having a $pK_a$ of greater than 20, said $pK_a$ being greater than the $pK_a$ of said acid,
(g) a lithium polymerization initiator in a non-polar, non-solvating liquid hydrocarbon solvent between —90° and about 100° C.,
(h) an alkaline earth metal polymerization initiator in a non-polar, non-solvating liquid hydrocarbon between —90° and 100° C.,
(i) a magnesium Grignard reagent in a non-polar, non-solvating liquid hydrocarbon medium between —90° and about 100° C.,
(j) a lithium polymerization initiator in a liquid medium comprising a hydrogen solvent for methyl methacrylate and not over 5% of a liquid ether between —40° and 100° C.,
(k) an alkaline earth metal polymerization initiator in a liquid medium comprising a hydrocarbon solvent for methyl methacrylate and not over 5% of a liquid ether between —40° and 100° C.,
(l) a magnesium Grignard halide from the class consisting of bromide and iodide between —40° and 100° C. in a liquid medium comprising a hydrocarbon solvent for methyl methacrylate and not over 5% of a liquid ether,
(m) a magnesium Grignard chloride between 25° and 100° C. in a liquid medium comprising a hydrocarbon solvent for methyl methacrylate and not over 5% of a liquid ether,
(n) a lithium polymerization initiator in a liquid medium comprising a hydrocarbon solvent for methyl methacrylate and not over 5% of a liquid ether below about —40° C.,
(o) an alkaline earth metal polymerization initiator in a liquid medium comprising a hydrocarbon solvent for methyl methacrylate and not over 5% of a liquid ether below about —40° C.,
(p) a magnesium Grignard halide from the class consisting of bromide and iodide in a liquid medium comprising a hydrocarbon solvent for methyl methacrylate and not over 5% of a liquid ether below about —40° C.,
(q) a magnesium Grignard chloride in a liquid medium comprising a hydrocarbon solvent for methyl methacrylate and not over 5% of a liquid ether below about 25° C., and
(r) an alkali metal polymerization initiator of an atomic weight greater than seven below —40° C. in a liquid hydrocarbon solvent, whereby polymers of methyl methacrylate are formed which possess steric regularities without developed crystallinity, polymerization systems (a) through (f) providing polymers leading to crystallinity corresponding to the X-ray diffraction pattern characterized in FIGURE 2, here identified as Type A, polymerization systems (g) through (m) providing polymers leading to crystallinity corresponding to the X-ray diffraction pattern characterized by FIGURE 3(a), here identified as Type B, and polymerization systems (n) through (r) leading to crystallinity corresponding to the X-ray diffraction pattern characterized by FIGURE 5(a), here identified as Type D, (2) separating the resulting polymer, (3) mixing said resulting polymer with a crystallizing organic solvent which has a solubility parameter δ from eight to 10 and which has a molar volume below 450 and at least a minimum molar volume related to the solubility parameter of solvents as defined in the following table for Types A, B, and D:

Table of Minimum Molar Volumes $(V_1)$ in Ml. for Changes in δ for Types A, B, and D

| δ | Minimum Volumes for— | | |
|---|---|---|---|
| | Type A | Type B | Type D |
| 8.0 | 110 | 114 | 75 |
| 8.5 | 135 | 135 | 95 |
| 9.0 | 160 | 157 | 117 |
| 9.3 | 175 | 170 | 130 |
| 9.5 | 164 | 158 | 115 |
| 10.0 | 137 | 129 | 78 |

(4) developing crystallinity of polymer in said solvent at a crystallizing temperature between 0° and 130° C., said temperature being below the melting point of the polymer carrying solvent, and for a crystallization period between about 5 minutes and about 50 hours, (5) separating polymer from solvent, and (6) evaporating residual solvent from the treated and separated polymer below the melting point of the separated polymer, carrying crystallizing solvent, said Type A being defined by an X-ray diffraction pattern having at least lines of relative intensity designated as medium to very strong, the lines being located with relative intensities at 10.2 A. (weak), 8.0 A. (medium), 6.6 A. (strong), 5.2 A. (weak), and 4.5 A. (weak), said Type B being defined by an X-ray diffraction pattern having at least lines of relatives intensity designated as medium to very strong, the lines being located with relative intensities at 10.0 A. (strong), 6.5 A. and 6.0 A. (very strong), and 5.2 A. (weak), and said Type D being defined by an X-ray diffraction pattern having at least lines of relative intensity designated as medium to very strong, the lines being located with relative intensities at about 20.5 A. (strong), 8.0 A. (medium), 6.4 A. (very strong), and 5.5 A. (weak).

2. Crystalline poly(methyl methacrylate) prepared according to the process of claim 1.

3. A process for preparing crystalline poly(methyl methacrylate) of Type A as herein defined and shown in FIGURE 2, having at least lines of relative intensities designated as medium to very strong, the lines being located with relative intensities at 10.2 A. (weak), 8.0 A. (medium), 6.6 A. (strong), 5.2 A. (weak), and 4.5 A. (weak), which comprises polymerizing below —40° methyl methacrylate in liquid phase in liquid ammonia under the influence of an alkali metal initiator, mixing the resulting polymer with a crystallizing organic solvent which is compatible with the said polymer from the class consisting of 4-heptanone, amyl acetate, 3-octanone, and 2-octanone, developing crystallinity of the polymer in the presence of said solvent at a crystallizing temperature between 0° and 130° and for a crystallization period between about 5 minutes and about 50 hours, separating solvent and treated polymer, and evaporating the solvent from the separated polymer below the melting point of the polymer carrying solvent.

4. Crystalline poly(methyl methacrylate) prepared according to the process of claim 3.

5. A process for preparing crystalline poly(methyl methacrylate) of Type A as herein defined and shown in FIGURE 2, having at least lines of relative intensities designated as medium to very strong, the lines being located at 10.2 A. (weak), 8.0 A. (medium), 6.6 A. (strong), 5.2 A. (weak), and 4.5 A. (weak), which comprises polymerizing methyl methacrylate in liquid phase between about 0° and −75° C. under the influence of a free radical polymerization initiator, mixing the resulting polymer with a crystallizing organic solvent from the class consisting of 4-heptanone, amyl acetate, 3-octanone, and 2-octanone, developing crystallinity of the polymer in said solvent at a crystallizing temperature between 0° and 130° C. and for a crystallization period between about five minutes and about 50 hours, separating polymer from said solvent, and evaporating the solvent from the separated polymer below the melting point of the polymer carrying solvent.

6. A process according to claim 5 in which free radicals are formed under the influence of actinic light and the presence of a photosensitizer.

7. A process for preparing crystalline poly(methyl methacrylate) of Type B as herein defined and shown in FIGURE 3(a), having at least lines of relative intensities designated as medium to very strong, the lines being located with relative intensities at 10.0 A. (strong), 6.5 A. and 6.0 A. (very strong), and 5.2 A. (weak), which comprises polymerizing methyl methacrylate in liquid phase in a non-polar, non-solvating medium which is a hydrocarbon solvent for methyl methacrylate in the presence of 0.01 to 10% by weight based on the methyl methacrylate of an aged Grignard magnesium halide reagent, the temperature of polymerization being between −90° and 100° C., mixing the resulting polymer with a crystallizing organic solvent which is compatible with the said polymer, which has a solubility parameter δ of 8 to 10, and which has a molar volume of at least 114, said volume having minimum values related to the said solubility parameters as defined in the following table:

*Table of Minimum Molar Volumes ($V_1$) in Ml. With Changes in δ*

| δ | $V_1$ |
|---|---|
| 8.0 | 114 |
| 8.5 | 135 |
| 9.0 | 157 |
| 9.3 | 170 |
| 9.5 | 158 |
| 10.0 | 129 | the maximum molar volume being not over 450, developing crystallinity in said solvent at a crystallizing temperature between 0° and 130° C. and for a crystallization period between about 5 minutes and about 50 hours, separating solvent and treated polymer, and evaporating solvent from the separated polymer below the melting point of the polymer carrying solvent.

8. Crystalline poly(methyl methacrylate) prepared according to the process of claim 7.

9. A process for preparing crystalline poly(methyl methacrylate) of Type D as herein defined and shown in FIGURE 5(a), having at least lines of relative intensities designated as medium to very strong, the lines being located with relative intensities at about 20.5 A. (strong), 8.0 A. (medium), 6.4 A. (very strong), and 5.5 A. (weak), which comprises polymerizing below −40° C. methyl methacrylate in liquid phase in a non-polar hydrocarbon liquid which is a solvent for methyl methacrylate and which contains 1% to 10% of an ether which is liquid below −40° C. under the influence of an aged magnesium Grignard reagent, mixing the resulting polymer with a crystallizing organic solvent which is compatible with the said polymer, which has a solubility parameter δ of 8 to 10, and which has a molar volume of 75 to 450, said volume having a minimum value depending on the said solubility parameter as defined in the following table:

*Table of Minimum Molar Volumes ($V_1$) in Ml. With Changes in δ*

| δ | $V_1$ |
|---|---|
| 8.0 | 75 |
| 8.5 | 95 |
| 9.0 | 117 |
| 9.3 | 130 |
| 9.5 | 115 |
| 10.0 | 78 | developing crystallinity in said solvent at a crystallizing temperature between 0° and 130° C. and for a crystallization period between about 5 minutes and about 50 hours, separating treated polymer and solvent, and evaporating solvent below melting point of the polymer carrying solvent.

10. Crystalline poly(methyl methacrylate) prepared according to the process of claim 9.

11. A process for preparing crystalline poly(methyl methacrylate) of Type A as herein defined and shown in FIGURE 2, having at least lines of relative intensities designated as medium to very strong, the lines being located with relative intensities at 10.2 A. (weak), 8.0 A. (medium), 6.6 A. (strong), 5.2 A. (weak), and 4.5 A. (weak), which comprises polymerizing methyl methacrylate in liquid phase in a polar liquid ether solvent having a $pK_a$ of at least 20 between −40° and −90° C. under the influence of an alkali metal salt of an acid having a $pK_a$ of 15 to 40, the $pK_a$ of the said polar solvent being greater than the $pK_a$ of the said acid, mixing the resulting polymer with a crystallizing organic solvent which is compatible with the said polymer from the class consisting of 4-heptanone, amyl acetate, 3-octanone, and 2-octanone, developing crystallinity of the polymer in said solvent at a crystallizing temperature between 0° and 130° C. and during a crystallization period between about 5 minutes and about 50 hours, separating treated polymer and solvent and evaporating said solvent from the separated polymer below the melting point of the polymer carrying solvent.

12. A process according to claim 11 in which the alkali metal is lithium.

13. A process for preparing crystalline poly(methyl methacrylate) of Type B as herein defined and shown in FIGURE 3(a), having at least lines of relative intensities designated as medium to very strong, the lines being located with relative intensities at 10.0 A. (strong), 6.5 A. (very strong), 6.0 A. (very strong), and 5.2 A. (weak), which comprises polymerizing methyl methacrylate in liquid phase in an inert medium with slight solvating power comprising a liquid hydrocarbon which is a solvent for methyl methacrylate with a minor proportion of liquid ether in the presence of a coordinating alkaline earth initiator in a concentration between 0.01% and 10% of the weight of the methyl methacrylate, the temperature of polymerization being between about −40° and 100° C., mixing the resulting polymer with a crystallizing organic solvent which is compatible with the said polymer, which has a solubility parameter δ of 8 to 10, and which has a molar volume of at least 114 and not over 450, said volume having a minimum value depending on the solubility parameter in accordance with the following table:

*Table of Minimum Molar Volumes ($V_1$) in Ml. With Changes in δ*

| δ | $V_1$ |
|---|---|
| 8.0 | 114 |
| 8.5 | 135 |
| 9.0 | 157 |
| 9.3 | 170 |
| 9.5 | 158 |
| 10.0 | 129 | developing crystallinity in said solvent at a crystallizing temperature between 0° and 100° C. and for a crystallization period between about 5 minutes and about 50 hours, separating polymer from solvent, and evaporating solvent from the treated polymer below the melting point of the polymer carrying solvent.

References Cited in the file of this patent
UNITED STATES PATENTS

| | | |
|---|---|---|
| 2,084,415 | Strain | June 22, 1937 |
| 2,413,973 | Howk et al. | Jan. 7, 1947 |
| 2,417,294 | D'Alelio | Mar. 11, 1947 |
| 2,458,378 | Herbolsheimer | Jan. 4, 1949 |
| 2,462,678 | Roedel | Feb. 22, 1949 |
| 2,608,555 | Bullitt | Aug. 26, 1952 |
| 2,744,886 | Protzman | May 8, 1956 |
| 2,841,574 | Foster | July 1, 1958 |
| 2,924,589 | Jurgeleit | Feb. 9, 1960 |

OTHER REFERENCES

Robinson et al.: Journal of Applied Physics, Vol. 15, pages 343–351 (1944).

Beaman: J. Am. Chem. Soc., 70, 3115 (1948).

Lander: Rec. Trav. Chem. Pays-bas, 68, 992 (1949).

Williams: J. Am. Chem. Soc., 78, 1260 (March 1956).

Fox et al.: J. Am. Chem. Soc. 80, 1768 (1958).

Fox et al.: J. Polymer Science 31, 173 (1958).

Miller: Chem. and Ind. #41, 1323 (1958).

Flory: "Principles of Polymer Chemistry," Cornell University Press (1953).

Basu et al.: Proceedings Royal Soc. (London), 1950 Vol. 202A, pp. 8–93.

Strain: I. & E. Chem., April 1939, Vol. 31, No. 4, pp. 382–7.